United States Patent
Reitmann

(10) Patent No.: US 8,733,714 B1
(45) Date of Patent: May 27, 2014

(54) ROLLING TRIVET APPARATUS

(76) Inventor: Michael Reitmann, Clayton, NC (US)

(*) Notice: Subject to any disclaimer, the term of this patent is extended or adjusted under 35 U.S.C. 154(b) by 123 days.

(21) Appl. No.: 13/470,582

(22) Filed: May 14, 2012

(51) Int. Cl.
*F16M 11/00* (2006.01)

(52) U.S. Cl.
USPC .............. 248/176.2; 248/346.11; 220/573.3

(58) Field of Classification Search
USPC .............. 248/176.2, 346.11, 129, 346.01; 220/573.1, 487, 573.3; D7/388
See application file for complete search history.

(56) References Cited

U.S. PATENT DOCUMENTS

| | | | |
|---|---|---|---|
| 477,564 A * | 6/1892 | Maximilian | 248/469 |
| D145,192 S * | 7/1946 | Zimmer | D7/388 |
| 3,967,803 A | 7/1976 | Kienlen et al. | |
| 6,067,698 A | 5/2000 | Silvera-Langley | |
| 6,367,748 B1 * | 4/2002 | Solomon et al. | 248/129 |
| 6,691,961 B2 * | 2/2004 | Solomon et al. | 248/129 |
| 7,137,603 B2 * | 11/2006 | Solomon et al. | 248/129 |
| 7,267,308 B1 * | 9/2007 | Jenson | 248/176.1 |
| 7,344,173 B2 | 3/2008 | Gonzalez et al. | |
| 8,070,116 B1 * | 12/2011 | Malaspino et al. | 248/176.2 |
| 8,561,957 B2 * | 10/2013 | Levine et al. | 248/346.03 |
| 2005/0151044 A1 | 7/2005 | Settele | |
| 2006/0087135 A1 * | 4/2006 | Gonzalez et al. | 294/27.1 |

* cited by examiner

*Primary Examiner* — Bradley Duckworth
(74) *Attorney, Agent, or Firm* — Crossley Patent Law; Micah C. Gunn

(57) ABSTRACT

A rolling trivet apparatus including a body member having a first surface and a second surface, a plurality of spherical bearing members volubly disposed in the second surface, and a first and second side member pivotally attached to the body member, said first and second side members moveable between a first position and a second position whereby a foot member disposed upon each of a plurality of hinge members protrudes from the second surface to releasably engage with and contact a surface upon which the device is used when each of the first and second side members is moved to the second position, whereby an extant serving dish is moveable upon the body member over said surface with which the device is used, and said serving dish is releasably securable in a desired location when the first and second side members are moved to the second position.

10 Claims, 2 Drawing Sheets

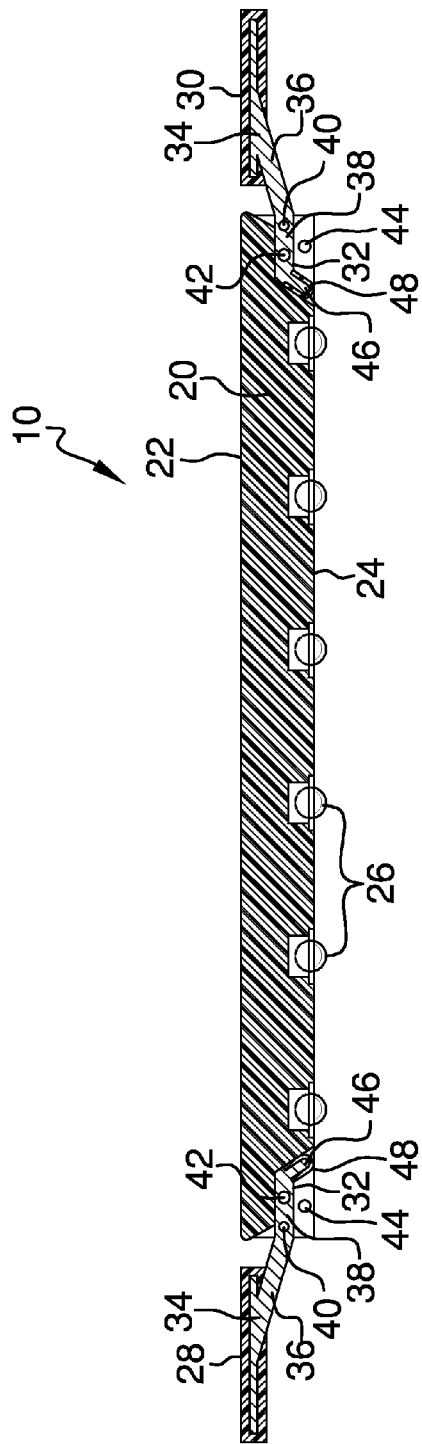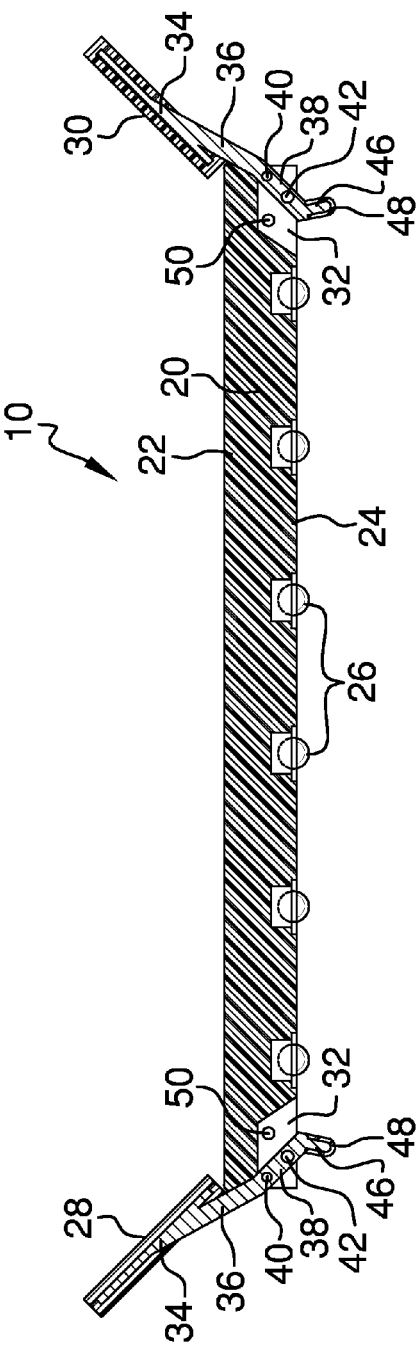

ROLLING TRIVET APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of trivet apparatuses, trestles, hot pads, mats, and other serving dish supports are known in the prior art. However, what is needed is a rolling trivet apparatus that includes a body member having a first surface and a second surface, a plurality of spherical bearing members volubly disposed in the second surface, and a first and second side member pivotally attached to the body member, said first and second side members moveable between a first position and a second position whereby a foot member disposed upon each of a plurality of hinge members protrudes from the second surface to releasably engage with and contact a surface upon which the device is used when each of the first and second side members is moved to the second position, whereby an extant serving dish is moveable upon the body member over said surface with which the device is used, and said serving dish is releasably securable in a desired location when the first and second side members are moved to the second position.

FIELD OF THE INVENTION

The present invention relates to a rolling trivet apparatus, and more particularly, to a rolling trivet apparatus including a body member having a first surface and a second surface, a plurality of spherical bearing members volubly disposed in the second surface, and a first and second side member pivotally attached to the body member, said first and second side members moveable between a first position and a second position whereby a foot member disposed upon each of a plurality of hinge members protrudes from the second surface to releasably engage with and contact a surface upon which the device is used when each of the first and second side members is moved to the second position, whereby an extant serving dish is moveable upon the body member over said surface with which the device is used, and said serving dish is releasably securable in a desired location when the first and second side members are moved to the second position.

SUMMARY OF THE INVENTION

The general purpose of the rolling trivet apparatus, described subsequently in greater detail, is to provide a rolling trivet apparatus which has many novel features that result in a rolling trivet apparatus which is not anticipated, rendered obvious, suggested, or even implied by prior art, either alone or in combination thereof.

Many trivets and hot pads for the placement of serving dishes, pots, plates, pans, and other suchlike trays typical of serving victuals therefrom, are seen in the prior art to support said serving dish upon a surface, such as a table, for example, without rendering damage to said surface. However, when serving foodstuffs from said serving dish, individual plates are typically passed around to a person serving from said serving dish, or said serving dish is passed around to each individual diner. Since said serving dish is typically hot, and oftentimes heavy, accidents are prone to occur. The present invention has been devised to securely support said serving dish thereupon, and readily transport said serving dish across said surface to obviate the need of relocating plates or handling said serving dish directly.

The present invention therefore is a rolling trivet apparatus including a body member having a plurality if spherical bearing members disposed volubly upon a second surface of the body member, said plurality of spherical bearing members configured to volubly engage with said surface upon which the present rolling trivet apparatus is positioned, whereby the body member is moveable atop said surface. A serving dish, of the type previously described, is supportable atop a first surface of the instant rolling trivet apparatus, said serving dish thereby moveable atop the body member of the rolling trivet apparatus when said rolling trivet apparatus is moved by means of the plurality of spherical bearing members.

Each of the plurality of spherical bearing members is comprised of a rubberlike material to ensure damage to the surface is averted when using the present rolling trivet apparatus. The term "rubberlike", as used in this specification, is taken to mean "having a consistency like rubber" and is intended to include other such substances as rubber, plastic, polymer, polymeric compositions, gels, or other such pliable and compliant substances having an elasticity and mollescence accordant with such usage to avert damage upon surfaces such as softwood, for example. The term is further taken to include suchlike coatings applied upon each of the plurality of spherical bearing members, such as a rubber coating surrounding a metal ball bearing, for example. The rubberlike properties of the plurality of spherical bearing members prevents damage and, moreover, lessens noise created when moving the present invention upon a surface such as a table top or tile countertop.

A first side member and a second side member are pivotally attached to the body member by means of a plurality of hinge members. The first side member and the second side member are movable between a first position and a second position. When the first and second side members are moved to the first position, each of said side members occupies a plane proximally congruent with the plane of the first surface of the body member. When moved to the second position, each of the first and second side members are raised upwardly to occupy a plane disposed at an obtuse angle relative the first surface of the body member.

Each of the first and second side members are pivotally attached to the body member by means of each of the plurality of hinge members. Each of the plurality of hinge members includes a first elongate piece attached to the respective side member at an acute angle relative the side member, a second elongate piece attached endwise to the first elongate piece, said second elongate piece disposed in a plane parallel with the plane of the respective side member. A foot member is disposed endwise upon each hinge member second elongate piece. Each of a plurality of channels is disposed within the body member to moveably accommodate each of the plurality of hinge members, each of said plurality of channels open to the second surface of the body member.

A pivot point rotatably connects the second elongate piece to the body member, said pivot point disposed proximal the first elongate piece. Each of the plurality of hinge members is disposed within each of the plurality of channels, said channels configured to moveably house each of the plurality of hinge members. Each of the plurality of channels is open to the second surface and when the hinge member is pivoted from the first position to the second position, the corresponding foot member protrudes out of the channel through the second surface to contact the surface, such as a table, upon which the preset rolling trivet apparatus is positioned.

The first and second side members are releasably secured in the first and second position by means of a ball detent disposed upon the second elongate piece of each of the plurality of hinge members. When a respective hinge member is moved to the second position, said ball detent releasably engages with a first receiving hole disposed upon the body member, said first receiving hole disposed within the respective channel. When the respective hinge member is moved to the first position, said ball detent releasably engages with a second receiving hole also disposed upon the body member within the respective channel.

When the first and second side members are thereby moved to the second position, the foot member disposed on each second elongate piece of each of the plurality of hinges is extended to protrude out of the second surface to contact and releasably engage with the surface, such as a table, upon which the present rolling trivet apparatus is used. The rolling trivet apparatus is thereby prevented from moving when the first and second side members are moved to the second position.

When the first and second side members are returned to the first position, each of said side members are lowered, each respective hinge member pivots, the second elongate piece moves upwardly, and each respective foot member is raised into the respective channel away from the surface, such as a table, upon which the present rolling trivet apparatus is used. The rolling trivet apparatus is thereby once again moveable by means of the plurality of spherical bearing members.

A serving dish is thereby moveable, and arrestable, upon a surface such as a table, without a person having to directly contact the serving dish. Hot foodstuffs may therefore be passed around a dinner table, for example, without having to pass individual plates between diners, heft and hold often heavy and hot serving dishes, reach for insulated mittens, or otherwise bother with a hot and oftentimes heavy serving dish. Use of the present rolling trivet apparatus enables easy, safe, and expedient transport of a serving dish around a dinner table, for example.

Thus has been broadly outlined the more important features of the present rolling trivet apparatus so that the detailed description thereof that follows may be better understood and in order that the present contribution to the art may be better appreciated.

Objects of the present rolling trivet apparatus, along with various novel features that characterize the invention are particularly pointed out in the claims forming a part of this disclosure. For better understanding of the rolling trivet apparatus, its operating advantages and specific objects attained by its uses, refer to the accompanying drawings and description.

BRIEF DESCRIPTION OF THE DRAWINGS

Figures

FIG. 3 is a cross section view taken along the line 3-3 of FIG. 2.

FIG. 4 is a cross-section view taken along the line 3-3 of FIG. 2 with a plurality of side members moved to a second position.

DETAILED DESCRIPTION OF THE DRAWINGS

Figure 1:
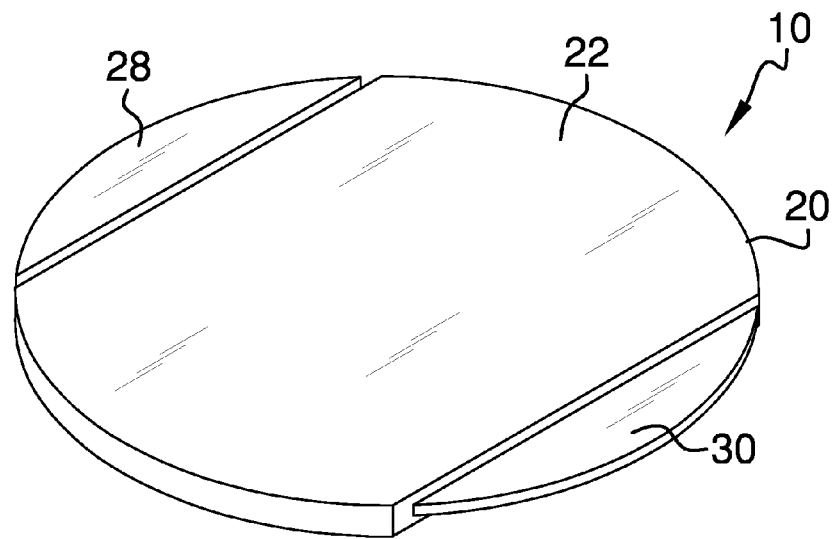
FIG. 1 is an isometric view.
Figure 2:
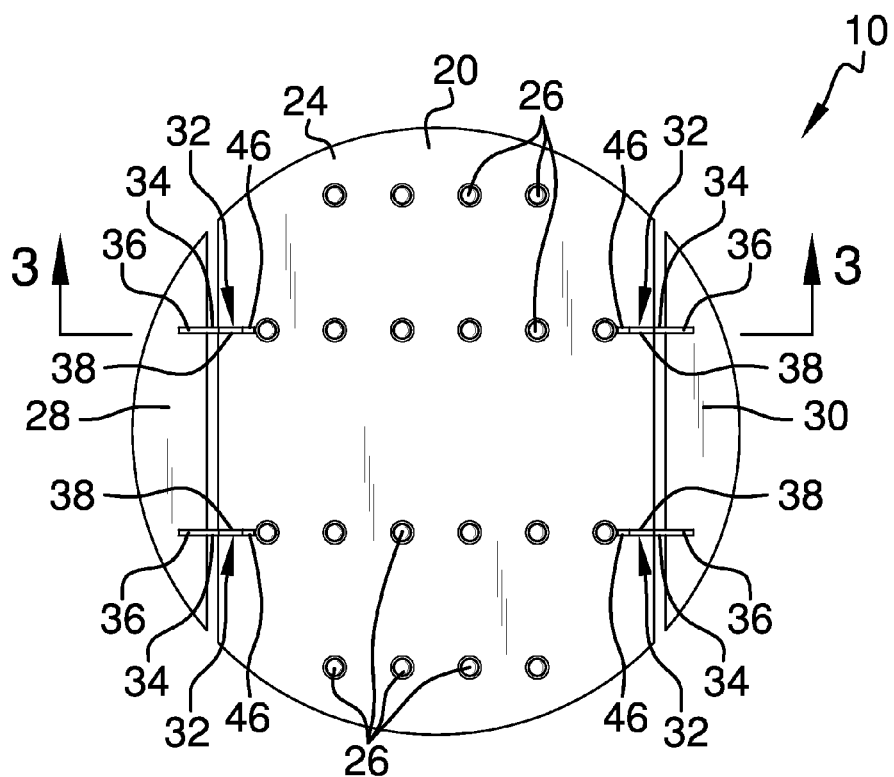
FIG. 2 is a bottom view.

With reference now to the drawings, and in particular FIGS. 1 through 4 thereof, example of the instant rolling trivet apparatus employing the principles and concepts of the present rolling trivet apparatus and generally designated by the reference number 10 will be described.

Referring to FIGS. 1 through 4 a preferred embodiment of the present rolling trivet apparatus 10 is illustrated.

The rolling trivet apparatus 10 includes a body member 20 having a first surface 22 and a second surface 24. A plurality of spherical bearing members 26 is volubly disposed in the second surface 24, each of said bearing members 26 made of a rubberlike material. Each of said plurality of spherical bearing members 26 protrudes from the second surface 24 to volubly engage with an extant surface, such as a table (not shown), upon which the present rolling trivet apparatus 10 is positioned. Each of the plurality of bearing members 26 is configured to enable smooth movement of the rolling trivet apparatus 10 atop said surface, and each bearing member 26 is manufactured from a rubberlike substance to ensure the rolling trivet apparatus 10 does not scratch, or otherwise damage, the surface upon which the rolling trivet apparatus 10 is used.

It should be understood that the term "rubberlike", as used in this specification, is intended to mean a pliable, smooth, soft and yielding substance with a consistency similar to rubber. Such substance is considered to include, but is in not intended to be limited to, rubber, polymers, gels, or other substances having an elasticity accordant with smooth operation upon a surface, such as a wooden table, for example, without scratching or otherwise damaging said surface. Said rubberlike substance, as used herein, is intended also to include a coating, should such prove warranted during manufacture, covering, for example, a ball bearing. Thusly, the rubberlike substance is intended to include configurations of the bearing members 26 wherein an obdurate substance, such as a metal, for example, is coated in a rubberlike substance or compound.

Each of the plurality of spherical bearing members 26 enables movement of the body member 20 upon a surface, such as a table for example, without rendering damage to said table. The body member 20 is therefore configured to receive and support an extant dish, pot, pan, plate, or other suchlike tray or serving dish (collectively "serving dish") for the housing and dispensing of victuals therefrom (not shown), and the present device 10 enables movement of said serving dish for the housing and dispensing of victuals without retouching said serving dish. The body member 20 may be easily rolled, by means of the plurality of spherical bearing members 26, across said surface, and said serving dish positioned atop the first surface 22, moved consequently thereby.

To arrest movement of the body member 20 atop a surface, such as a table, stop means is included as will be subsequently described. Said stop means includes a first side member 28 hingedly attached to the body member 20 and a second side member 30 hingedly attached to the body member 20 on an opposite side of the body member 20. Each of the first side member 28 and the second side member 30 are moveable between a first position and a second position.

A plurality of channels 32 is disposed within the body member 20, each of the plurality of channels 32 configured to accommodate a plurality of hinge members 34 when each of the first and second side members 28, 30 are moved between the first position and the second position. Each of the plurality of channels 32 is also open to the second surface 24. Each of the plurality of hinge members 34 is pivotally disposed within each of the plurality of channels 32. Each of the plurality of hinge members 34 pivotally connects each of the first and second side members 28, 30 within each of the respective plurality of channels 32.

Each of said hinge members 34 includes a first elongate piece 36 attached to each of the respective first and second side members 28, 30 at an acute angle relative the respective side member 28, 30, and a second elongate piece 38 attached to the first elongate piece 36 in a plane parallel with the respective first and second side member 28, 30. A pivot point 40 is disposed upon the second elongate piece 38 proximal to where the first elongate piece 36 joins the second elongate piece 38, said pivot point 40 connected to the body member 20 within the respective one of the plurality of channels 32. A ball detent 42, disposed upon the second elongate piece 38, is configured to releasably engage with a respective first receiving hole 44 disposed upon the body member 20 within each of the plurality of channels 32, and a second receiving hole 50 disposed upon the body member 20 within each of the plurality of channels 32, whereby each of the first and second side members 28, 30 is releasably securable in the first and the second position (see FIGS. 3 and 4).

A foot member 46 is disposed endwise upon each of the hinge members 34 second elongate piece 38. A rubberlike coating 48 is disposed upon said foot member 46. The foot member 46 of the second elongate piece 38 of each of the plurality of hinge members 34 is disposed to project downwards out of the second surface 24 of the body member 20 when each of the respective first and second side member 28, 30 is moved to the second position, said foot member 46 configured to arrest the movement of the rolling trivet apparatus 10 upon a surface, such as a table. Each respective foot member 46 is configured to project downward from each respective channel 32 and out of the second surface 24 into a plane proximally congruent with the plane of a lower extremity of each of the plurality of spherical bearing members 26. The foot member 46 may also be configured to project further downward than the lower extremity of spherical members 26, as shown in FIG. 4.

The first side member 28 and the second side member 30 are thereby pivotally moveable and releasably securable by means of each respective hinge member 34 between the first position, wherein the first and second side members 28, 30 are disposed in a plane proximally congruent with the plane of the first surface 22 of the body member 20, and a second position, wherein each of the respective first and second side members 28, 30 is disposed at an obtuse angle with respect to the first surface 22 of the body member 20. Each foot member 46, disposed endwise on the second elongate piece 38 of the respective hinge member 34, is thereby movably engaged, and releasably secured, to contact with a surface upon which the rolling trivet apparatus 10 is positioned. When each of the first and second side members 28, 30 are moved to the first position, each of said side members 28, 30 move downward to a plane proximally congruent with the plane of the first surface 22 of the body member 20 and each foot member 46 is raised into the respective channel 32. The rolling trivet apparatus 10 is again moveable by means of the plurality of spherical bearing members 26.

The rolling trivet apparatus 10 includes a heat resistant material whereby placement of an extant hot dish is enabled thereupon. Said heat resistant material may be included upon the body 20 and each of the first and second side members 28, 30, or comprise the body 20 or each of the first and second side members 28, 30. In the preferred embodiment herein disclosed, the rolling trivet apparatus 10 is configured to have a generally ovoid shape, however the present rolling trivet apparatus 10 should not be considered limited to a generally ovoid, circular, or parallelepiped shape, the primary considered features and scope of the invention comprising the plurality of spherical bearing members 26 disposed protruding from the second surface 24, the movable first and second side members 28, 30, each of the plurality of hinge members 34, and the extensibility of the corresponding foot members 46 to arrest the movement of the device 10, as desired, when serving food from an extant serving dish placed thereupon.

What is claimed is:

1. A rolling trivet apparatus comprising:
    a body member having a first surface and a second surface;
    a plurality of spherical bearing members volubly disposed upon the second surface;
    a first side member hingedly attached to the body member;
    a second side member hingedly attached to the body member;
    each of the first and second side members attached to the body member by a plurality of hinge members moveably disposed upon the body member;
    a foot member disposed endwise upon each of the hinge members;
    wherein the first side member and the second side member are moveable and releasably securable between a first position and a second position, whereby each foot member is extensible through the second surface when said side members are moved to the second position, to arrest movement of the body member thereby, and each foot member is moved within the body member second surface when each of the first and second side members are moved to the first position.

2. The rolling trivet apparatus of claim 1 wherein each of the hinge members further comprise:
    a first elongate piece attached to the respective first and second side member, said first elongate piece disposed at an acute angle relative said respective side member;
    a second elongate piece attached to the first elongate piece, said second elongate piece disposed in a plane generally parallel with the respective first and second side member;
    a pivot point disposed upon the second elongate piece;
    a ball detent disposed upon the second elongate piece;
    wherein the second elongate piece is disposed parallel with the body member second surface when the respective first and second side member is moved to the first position, and the second elongate piece is disposed angularly relative the body member second surface when the respective first and second side member is moved to the second position.

3. The rolling trivet apparatus of claim 2 wherein the body member further comprises a plurality of channels open to the second surface, each of said plurality of channels configured to house each of the plurality of hinge members, whereby each of said hinge members is pivotally disposed within each of said channels whereby each foot member is extensible therefrom when each of the respective first and second side members is moved to the second position.

4. The rolling trivet apparatus of claim 3 wherein each ball detent disposed on each of the plurality of hinge members releasably engages with each of a corresponding first receiving hole, each of said first receiving hole disposed within each of the plurality of channels, when each of the respective first and second side members is moved to the second position whereby each of said side members is releasably securable in the second position.

5. The rolling trivet apparatus of claim 4 wherein each ball detent disposed on each of the plurality of hinge members releasably engages with each of a corresponding second receiving hole, each of said second receiving hole disposed within each of the plurality of channels, when each of the respective first and second side members is moved to the first position whereby each of said side members is releasably securable in the first position.

6. The rolling trivet apparatus of claim 5 wherein each of the plurality of spherical bearing members comprises a spherical body volubly disposed in the second surface, each of said plurality of spherical bearing members comprising a rubberlike material whereby the extant surface upon which the rolling trivet apparatus is used is not scratched or damaged by the action of the plurality of spherical bearing members thereupon when the rolling rivet apparatus is moved upon said extant surface.

7. The rolling trivet apparatus of claim 6 wherein each foot member comprises a rubberlike coating whereby said extant surface is not scratched or damaged by the action of each of said foot members when each of the respective first and second side members is moved to the second position.

8. The rolling trivet apparatus of claim 7 wherein the body member and each of the first and second side members includes a heat resistant material.

9. A rolling trivet apparatus comprising:
   a body member comprising:
      a first surface and a second surface;
      a plurality of channels open to the second surface;
      a first receiving hole disposed within each of the plurality of channels;
      a second receiving hole disposed within each of the plurality of channels;
      a plurality of spherical bearing members volubly disposed in the second surface, each of said bearing members comprising a rubberlike material;
   a first side member hingedly attached to the body member;
   a second side member hingedly attached to the body member;
   a plurality of hinge members pivotally connecting each of the first and second side members within each of the respective plurality of channels, each of said hinge members comprising:
      a first elongate piece attached to each of the respective first and second side members at an acute angle relative each respective first and second side members;
      a second elongate piece attached to the first elongate piece in a plane generally parallel with each respective first and second side member;
      a pivot point disposed upon the second elongate piece, said pivot point connected to the body member within the respective one of the plurality of channels;
      a ball detent disposed upon the second elongate piece, said ball detent configured to releasably engage with each respective first and second receiving hole;
      a foot member disposed endwise upon each of the hinge members;
      a rubberlike coating disposed upon said foot member;
   wherein the first side member and the second side member are pivotally moveable and releasably securable by means of each respective hinge member between a first position and a second position, whereby each foot member is extended through the second surface when said side members are moved to the second position to arrest movement of the body member thereby, and each foot member is moved within the body member second surface when each of the first and second side members are moved to the first position and the rolling trivet apparatus is moveable upon an extant surface thereby.

10. The rolling trivet apparatus of claim 9 wherein the body member and each of the first and second side members is made of a heat resistant material.

\* \* \* \* \*